United States Patent
Laureanti

(10) Patent No.: US 6,823,003 B2
(45) Date of Patent: Nov. 23, 2004

(54) MULTI-PATH TRANSCEIVER AMPLIFICATION APPARATUS, METHOD AND SYSTEM

(75) Inventor: Steven J. Laureanti, Lewisville, TX (US)

(73) Assignee: Infineon Technologies AG, Munich (DE)

( * ) Notice: Subject to any disclaimer, the term of this patent is extended or adjusted under 35 U.S.C. 154(b) by 357 days.

(21) Appl. No.: 09/760,858

(22) Filed: Jan. 15, 2001

(65) Prior Publication Data

US 2002/0094023 A1 Jul. 18, 2002

(51) Int. Cl.$^7$ ............................................... H04L 27/00
(52) U.S. Cl. ...................... 375/219; 325/257; 325/297; 370/293; 370/294
(58) Field of Search ................................. 375/219, 257, 375/297, 132; 370/293, 294; 333/126, 128, 277, 295

(56) References Cited

U.S. PATENT DOCUMENTS

| | | | | |
|---|---|---|---|---|
| 5,247,269 A | * | 9/1993 | Boulouard et al. | 333/126 |
| 5,502,715 A | * | 3/1996 | Penny | 370/293 |
| 6,108,313 A | * | 8/2000 | Lee et al. | 370/294 |
| 6,377,608 B1 | * | 4/2002 | Zyren | 375/132 |

* cited by examiner

*Primary Examiner*—Shuwang Liu
(74) *Attorney, Agent, or Firm*—Baker Botts L.L.P.

(57) ABSTRACT

A multi-path transceiver apparatus, method and system for implementation in a bidirectional antenna path by which a transceiver output signal is provided with a path independent from a separate signal path provided for incoming signals. The invention facilitates the amplification of transmitted signals without damaging the received signals and avoids modification to transceiver and bidirectional antenna hardware.

10 Claims, 2 Drawing Sheets

MULTI-PATH TRANSCEIVER AMPLIFICATION APPARATUS, METHOD AND SYSTEM

TECHNICAL FIELD

This invention relates in general to the amplification of transmitted signals for use with a bidirectional transceiver/antenna system. More particularly, the invention relates to apparatus, methods, and systems implemented in the antenna path of a transceiver for amplification of transmitted signals without detriment to received signals.

BACKGROUND OF THE INVENTION

A radio transceiver is well known in the art as a combination transmitter-receiver that uses many of the same components for both transmission and reception of radio signals. Bidirectional radio antennas are equally well known in the art for providing a single bidirectional signal path in two opposing directions for radio transmission and reception.

Although many applications for radio transceiver and antenna systems exist in the art, small, low-cost and short-range radio modules, such as the Ericsson Bluetooth module, available from Ericsson Telefonaktiebolaget L.M. of Sweden, are increasingly used for many different types of applications requiring a communication interface. Typical devices in which the Bluetooth transceiver module can be used are portable computers, hand-held wireless devices, digital cameras, computer peripherals, and mobile phone accessories. Typically, small relatively low-cost, short-range radio transceivers are mass-produced in a standardized self-contained package or module.

A serious problem with radio transceivers in general, and small, low cost radio transceivers such as Bluetooth modules in particular, is encountered when increased output signal power is desired. Generally speaking, output signal amplification can be achieved most simply by providing an amplifier in the transmission circuitry of the transceiver without adversely affecting the reception circuitry. Although this amplification solution is acceptable in custom transceiver designs, the cost and time advantages inherent in mass-production and standardization are lost if off-the-shelf transceivers are to be used. It is not possible to simply add an amplifier to the transmission circuitry of a Bluetooth radio module, for example. There is, therefore, a need for a cost-effective solution to the problem of increasing output signal power while simultaneously avoiding detriment to signal reception without modifying off-the-shelf radio transceiver modules and/or bidirectional antennas.

SUMMARY OF THE INVENTION

Disclosed is amplification apparatus for use with a transceiver having a bidirectional signal path between the transceiver input/output port and a bidirectional input/output antenna. The apparatus has a first divider coupled to the bidirectional signal path at the input/output port of the transceiver. The first divider divides the bidirectional signal path into an independent transmission path and an independent reception path. A transmission signal amplifier is included in the transmission path for amplifying the transmitted signal. A second divider recombines the independent transmission path and reception path into a bidirectional signal path for coupling with a bidirectional antenna.

Also disclosed is a method of signal amplification performed between a transceiver input/output port and a bidirectional antenna. The method amplifies a transceiver output signal to produce an amplified output signal. The amplified output signal is then broadcast using the bidirectional antenna. Input signals received using the bidirectional antenna are allowed to pass into the input of the transceiver without sacrificing receiver performance by bypassing the signal path used to achieve output signal amplification.

Additionally, a transceiver system is disclosed providing transceiver apparatus having a bidirectional signal path including a transmit/receive port, amplification apparatus for amplifying transmitted signals, a receive path, and a transmit/receive antenna.

The invention apparatus, method, and system embodiments disclosed include implementation of the inventions using a Bluetooth radio module. Bluetooth is a registered trademark of Telefonaktiebolaget L. M. Ericsson of Sweden. Use of the invention with Bluetooth radio modules provides technical advantages in cost and flexibility for adapting the modules to various applications.

An additional technical advantage of the invention is that amplification of transmitted signals can be provided without detriment to received signals using existing radio transceivers and antennas without alteration of the transceiver and antenna hardware.

Further technical advantages are realized by the invention in that the transmitted signal of a transceiver can be increased by orders of magnitude over the actual transceiver output amplitude providing an increased transmission range for a given transceiver.

BRIEF DESCRIPTION OF THE DRAWINGS

The above advantages, as well as specific embodiments of the present invention, will be more clearly understood from consideration of the following descriptions in connection with accompanying drawings in which.

Corresponding numerals and symbols in the various figures refer to corresponding parts unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. It should be understood that the invention may be practiced with transceivers and antennas of various types and sizes. Some features of embodiments shown and discussed are simplified or exaggerated for illustrating the principles of the invention.

Figure 1:
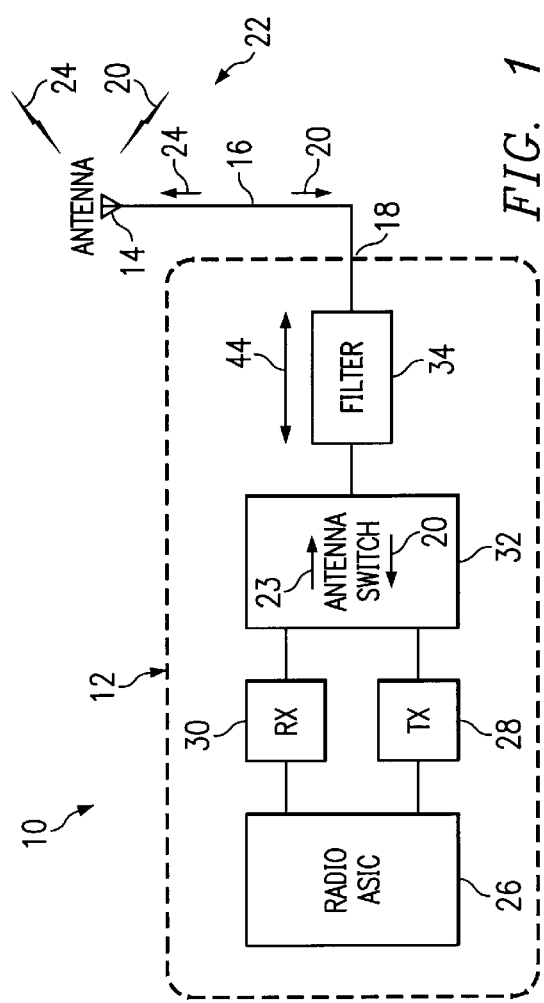
FIG. 1 is a block diagram of a radio transceiver module and antenna with which the invention may be practiced.

FIG. 1 is a block diagram of a radio transceiver and antenna with which the invention may be practiced. A transceiver/antenna system 10 is shown having a radio transceiver module 12 such as, for example, a 0 dBm Bluetooth module available from Ericsson, Inc. USA. "Bluetooth" is a registered trademark of Telephonaktiebolaget L. M. Ericsson, Sweden. It should be understood that the self-contained transceiver module 12 in the transceiver/antenna system 10 is, by its self-contained nature, not readily susceptible to modifications such as providing for increased transmission power. The invention may be practiced with any suitable transceiver where it is advantageous to amplify the transmitted signal from the transceiver without also causing detriment to the signal received by the transceiver.

A bidirectional antenna 14 is connected via a bidirectional transmission line 16 to an input/output port 18 of the transceiver 12. The bidirectional antenna 14 is capable of receiving input signals 20 from the atmosphere 22. The bidirectional antenna 14 is also capable of sending transmitted signals 24 into the atmosphere 22 from the transceiver 12. In the present example, the transceiver 12 contains a radio Application-Specific Integrated Circuit (ASIC) 26, coupled to transmitting circuitry 28 and receiving circuitry 30. An antenna switch 32 enables the transceiver 12 to switch between transmission and reception modes. An antenna filter 34 is provided to block unwanted signals in the receive mode and reduce harmonics in the transmit mode. It should be understood that the transceiver/antenna system 10 operates in either the transmit mode or receive mode at any given time. The system 10, however, does not transmit and receive simultaneously.

In the transmission mode, the radio ASIC 26 initiates transmission through the transmission circuitry 28. Thereupon, the antenna switch 32 switches to the transmission mode, a pre-transmission signal 23 is permitted to pass through the filter 34 and a resulting transmitted signal 24 exits the transceiver module 12 through the input/output port 18. The transmitted signal 24 travels through transmission line 16 to the antenna 14, and finally passes through the atmosphere 22, for reception at a destination.

Operating in the reception mode, a received signal 20 travels through the atmosphere 22 until it is intercepted by the bidirectional antenna 14. The received signal 20 then passes through the transmission line 16 until reaching the input/output port 18. The antenna switch 32 is positioned for receiving the signal 20, which is then filtered by filter 34 for passage through receive circuitry 30 into the radio ASIC 26 for further processing.

Figure 2:
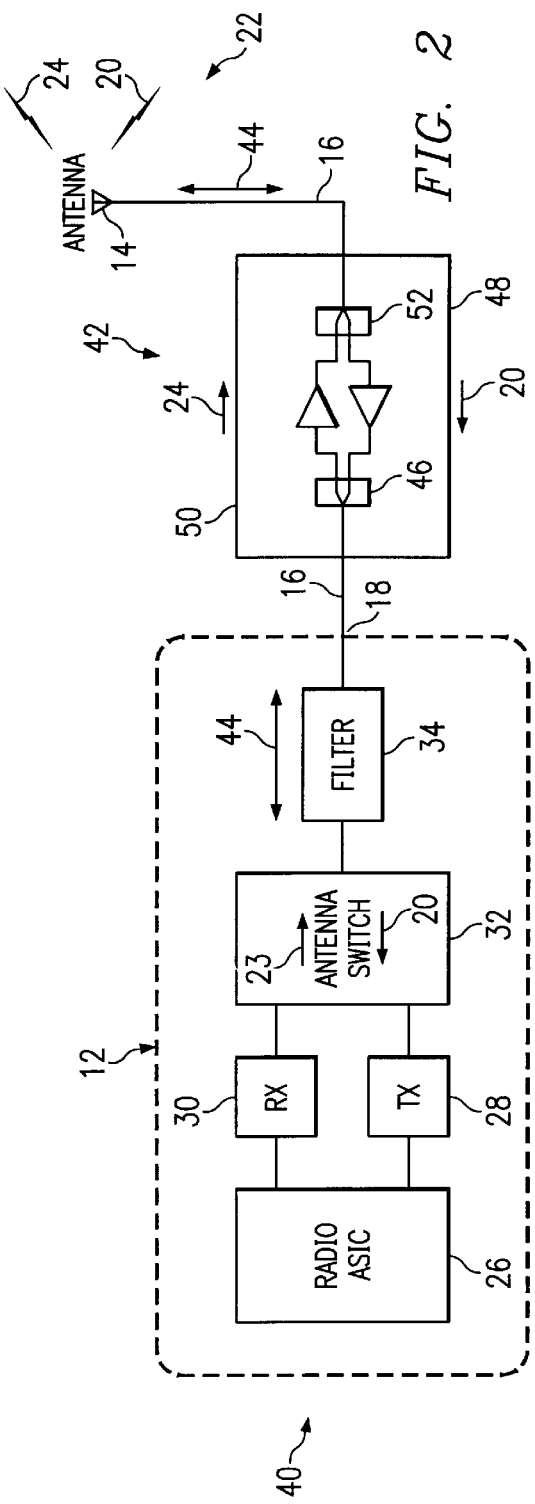
FIG. 2 is a block diagram showing an example of the use of the invention of FIG. 2 with the transceiver and antenna system of FIG. 1.

To better understand the advantages and use of the invention, reference is made to FIG. 2, which illustrates an example of apparatus 42 implementing the concept of the invention in a transceiver/antenna system 40. The transceiver/antenna system 40 of the invention is shown with amplification apparatus 42 electrically connected in the bidirectional transmission line 16 between the input/output port 18 of a transceiver module 12 and a bidirectional antenna 14. The bidirectional signal path 44 shown by the two-headed arrow is separated at a first divider 46, where an independent reception path 48 carries received signals, indicated by arrow 20, and an independent transmission path 50 carries transmitted signals, indicated by arrow 24. The paths 48, 50 are recombined at second divider 52 where a bidirectional signal path 44 is provided through the transmission line 16 to the bidirectional antenna 14. Note that the terms "first divider" and "second divider" are used for convenience of description. It is generally understood in the art that a signal "divider" also functions to combine a signal travelling in the opposite direction.

Figure 3:
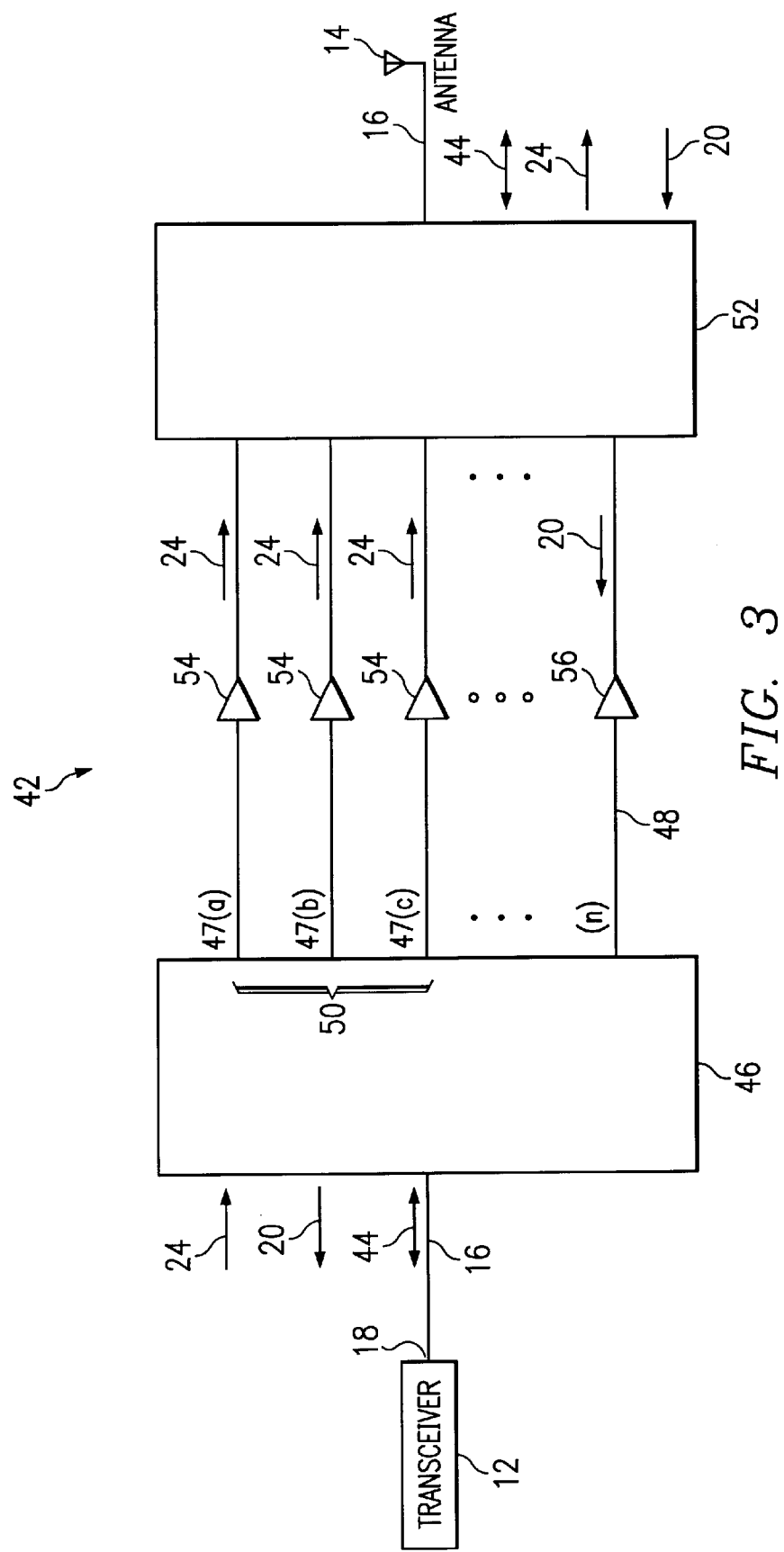
FIG. 3 is a block diagram illustrating an example of the apparatus of the invention.

Now referring primarily to FIG. 3 showing a more detailed close-up diagram of the amplification apparatus 42, the principles and implementation of the inventions are further described. As described above with reference to FIG. 2, in general, the amplification apparatus 42 is designed to provide an independent reception path 48 and an independent transmission path 50 within the bidirectional signal path 44 to facilitate physically separate circuits for transmitted signals 24 and received signals 20. Preferably, the transmitted signal 24 is split by a first Wilkinson divider 46 after exiting the transceiver 12.

Further referring to FIG. 3, the transmitted signal 24 may be divided into n physical branches 47(a . . . n). One or more amplifiers 54 are provided along transmission path 50. Preferably, amplifiers 54 are standard signal amplifying devices such as, for example, operational amplifiers with gain, although similar amplifier components may also be used. Preferably, the transmission signal 24 is equally divided among the divider branches 47(a . . . n).

The first divider 46 provides high isolation between the transmit and receive paths 50, 48, thereby ensuring that mismatch and cross-talk are minimized. A second Wilkinson divider 52 reunites the transmitted signal 24 components, providing access to the antenna 14 through bidirectional transmission line 16. The signal 24 that exits the independent transmission path 50 is an aggregation of the signals of the branches 47(a . . . n) and is preferably orders of magnitude greater in amplitude than the signal 24 in the receive path 48.

When operating in the receive mode, the received signal 20 path begins at antenna 14 and flows toward transceiver input/output port 18, first reaching the second Wilkinson divider 52, whereby the received signal 20 follows reception path 48, passing, in turn, through the first divider 46 and transceiver input/output port 18. Optionally, the receive path 48 may include a pass-through device 56, preferably a low noise amplifier for amplifying the received signal 20.

It should be understood that two independent physical paths 48 and 50 for reception and transmission, respectively, are provided. It should be clear that the paths are used alternately when the transceiver 12 operates in either the transmission or reception mode. It should also be clear that changes in the transceiver 12 and/or in the exact configuration of the amplifier apparatus 42 will not alter the concept of the invention.

The present invention achieves technical advantages by allowing for an increase in transceiver output power, which can be implemented in the antenna path without modification of the transceiver itself. The amplification of the transmitted signal is achieved without distortion of the received signal. For example, it is known that a typical isolation of greater then 51 dB can be achieved between the transmit and receive ports of Wilkinson dividers since the receive and transmit signal are in phase. Therefore, in the example shown and described herein a maximum of 26 dB of gain would be acceptable in order to keep 25 dB of isolation between the ports without detriment to the received signal.

The embodiments shown and described above are only exemplary. Even though numerous characteristics and advantages of the present invention have been set forth in the foregoing description together with details of the method of the invention, this disclosure is illustrative only and changes may be made within the principles of the invention to the full extent indicated by the broad general meaning of the terms used in the attached claims.

What is claimed is:

1. Amplification apparatus for use with a transceiver having a bidirectional signal path and an antenna, comprising:

a first divider operably coupled to said bidirectional signal path for dividing said bidirectional signal path into a plurality of transmission paths having the same frequency spectrum and a reception path;

a plurality of transmission signal amplifiers operably included in said transmission paths; and a second divider for combining said transmission paths and said reception path into a bidirectional signal path for coupling to said antenna;

wherein the transceiver comprises a Bluetooth radio transceiver.

2. The apparatus of claim 1 further comprising a reception pass-through operably included in said reception signal path.

3. The apparatus of claim 2 wherein said reception pass-through comprises a low-noise amplifier.

4. The apparatus of claim 1 wherein at least one of said first and second dividers comprises a Wilkinson divider.

5. The apparatus of claim 1 wherein said amplification apparatus comprises a module for operably coupling in a transceiver antenna path.

6. The apparatus of claim 1 wherein said signals on said transmission paths are in phase with signal on said reception path.

7. A method of signal amplification performed between a transceiver input/output port and a bidirectional antenna, comprising:

dividing a transceiver output into a plurality of output signals having the same frequency spectrum;

amplifying one or more of said output signals;

combining said output signals to produce an amplified output signal;

broadcasting said amplified output signal using said bidirectional antenna;

receiving an input signal using said bidirectional antenna; and thereafter passing said input signal into said transceiver; wherein said input signal remains substantially unaltered.

8. The method of claim 7 wherein said input signal and said transceiver output signal comprise frequencies within the range of 2.4–2.5 Ghz.

9. The method of claim 7 wherein said input signal and said transceiver output signal consist of frequencies within the range of approximately 2.4–2.5 Ghz.

10. Amplification apparatus for use with a transceiver having a bidirectional signal path having a transmit/receive port and an antenna, comprising:

a first Wilkinson divider operably coupled to said bidirectional signal path for dividing said bidirectional signal path into a plurality of transmission paths and a reception path;

a plurality of transmission signal amplifiers operably included in said transmission paths; and a second Wilkinson divider for combining said plurality of transmission paths and said reception path into a bidirectional signal path for coupling to said antenna;

wherein the transceiver comprises a Bluetooth radio transceiver, and wherein input signals remain substantially unaltered on the reception path in order to keep approximately 25 dB of isolation between the two ports.

* * * * *